Sept. 29, 1953 W. W. SLOANE 2,653,700
IDLER ROLLER ASSEMBLY FOR BELT CONVEYERS
Filed Nov. 15, 1951 2 Sheets-Sheet 1
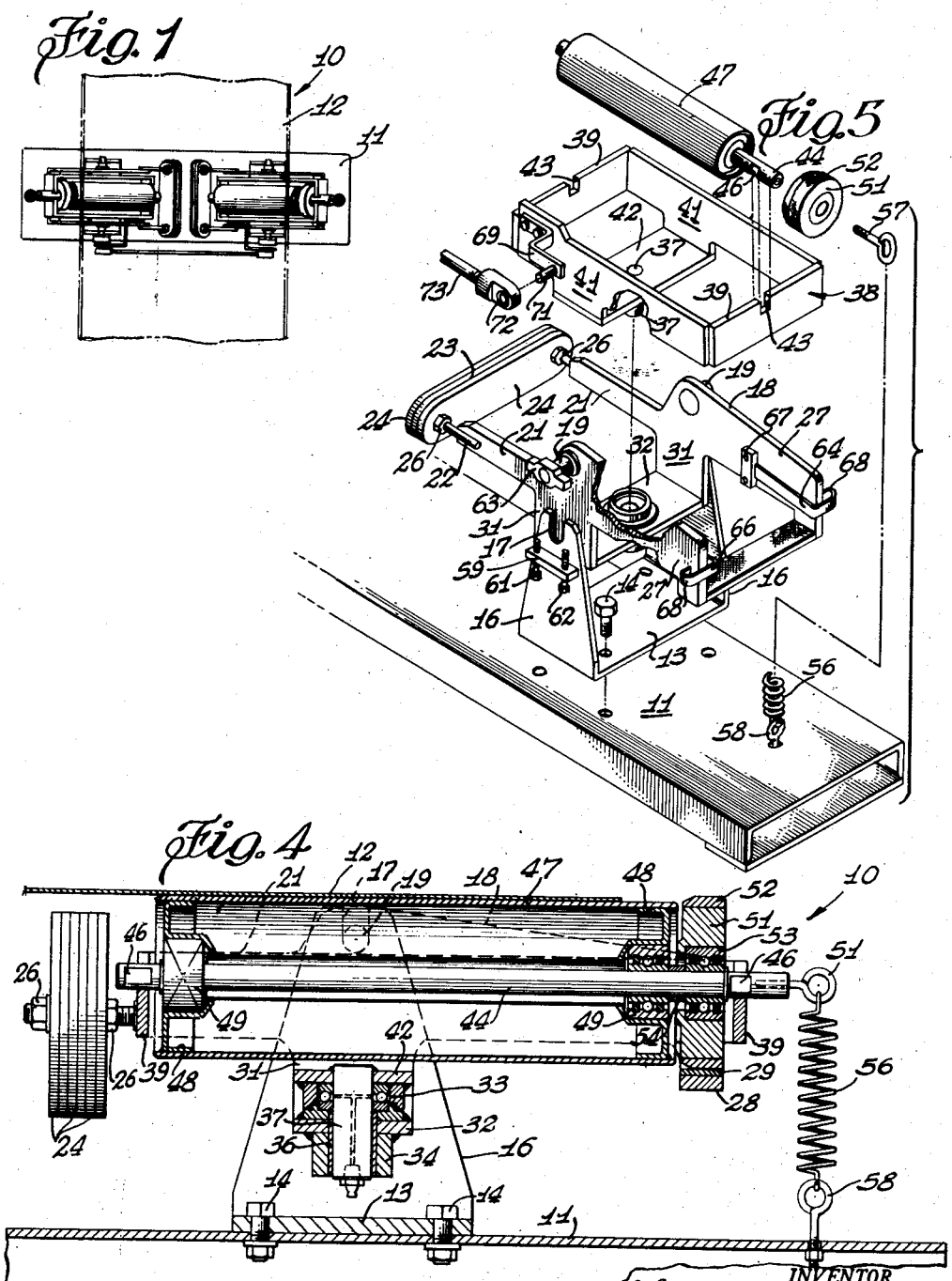
INVENTOR.
William W. Sloane
BY
Murray A. Gleeson
ATTORNEY

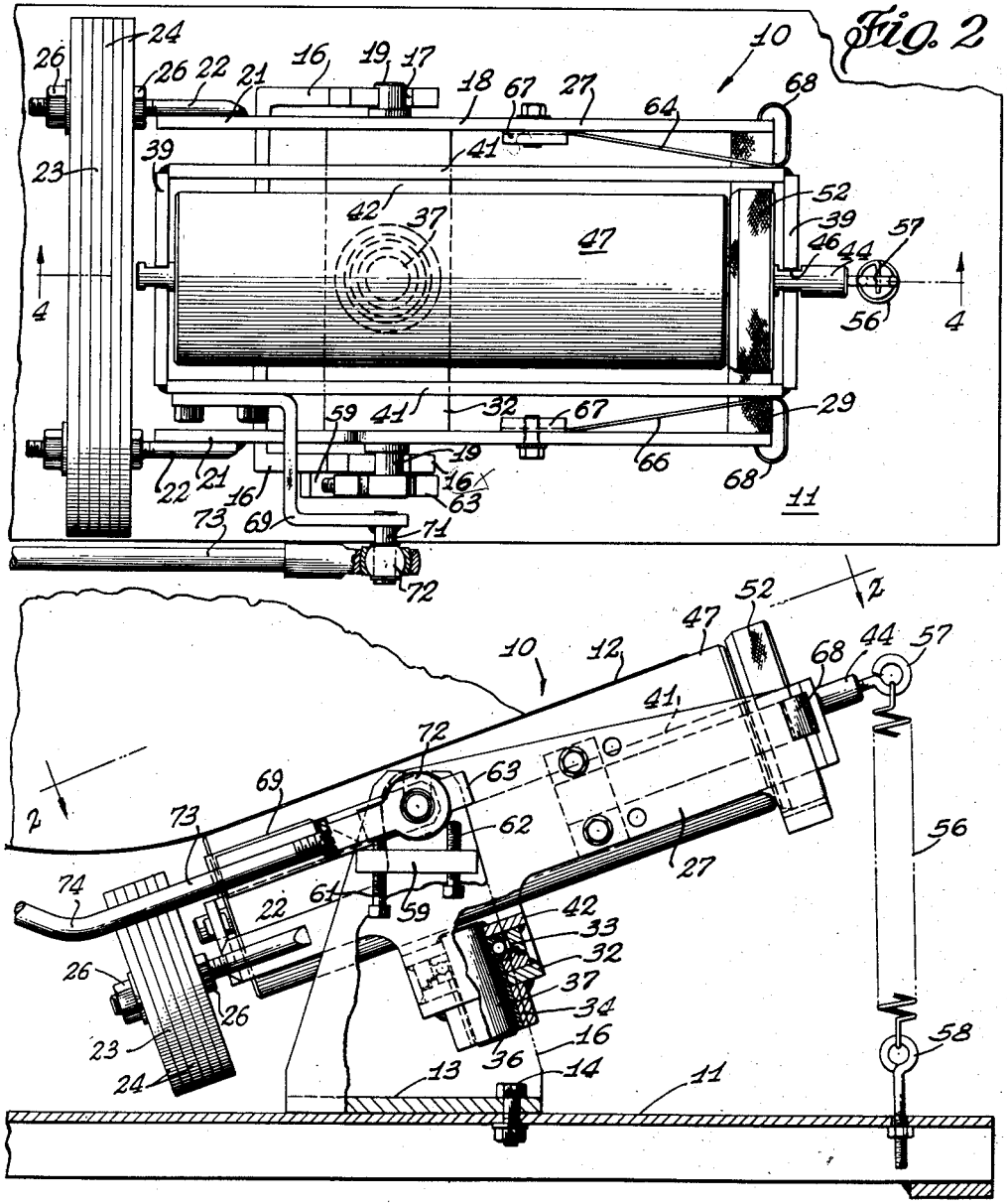

Patented Sept. 29, 1953

2,653,700

UNITED STATES PATENT OFFICE 2,653,700

IDLER ROLLER ASSEMBLY FOR BELT CONVEYERS

William W. Sloane, Chicago, Ill., assignor to Goodman Manufacturing Company, Chicago, Ill., a corporation of Illinois Application November 15, 1951, Serial No. 256,418

7 Claims. (Cl. 198—202)

This invention relates generally to endless belt conveyor systems and relates particularly to improvements in mechanisms for correcting the misalignment of a conveyor belt.

The invention is shown and described in connection with an endless conveyor made of thin metal such as steel, which is becoming to be favorably received over rubber or composition belting for endless conveyors in certain types of applications, as the conveying of coal or the like in an underground mine.

In such endless conveyors the endless belt is supported at intervals throughout its length upon rollers extending laterally of and underneath the belt, frames being provided for mounting of the rollers. In spite of care with which the frames and rollers may be located to align the belt properly, changes in loading conditions and varying temperature conditions oftentimes cause the belt to become misaligned. Heretofore misalignment has been corrected by guide rollers having their peripheries in contact with the edges of the belt, but such arrangements have been open to the objection in the case of composition belting of fraying the edges, or in the case of steel belting, of the belting being unable to take the thrusts occasioned by the guide rollers.

In carrying out the present invention the misalignment of the belt is caused to shift the axis of rotation of the support rollers in a direction to correct the misalignment, the action of the rollers alone correcting the misalignment, there being no guiding rollers in contact with the edges of the belt. The invention is further characterized by a frame which is mounted for tilting movement along a plane transverse to the axis of the belt, the amount of tilt of the frame being adjusted in accordance with the degree of troughing desired in the belt. The frame supports a cage arranged to swivel to a limited degree with respect to an axis normal to the tilting axis of the frame, the cage supporting a troughing roller turning on a non-rotating shaft, which shaft also supports a friction wheel engaged by the belt during misalignment thereof. The periphery of the friction wheel is also in contact with a track disposed on the frame, so that the frictional engagement of the wheel will swing the cage together with the troughing roller against the load of a centering spring for the cage in a direction to realign the belt. In a preferred aspect of the invention, the swiveling movement of the cage is caused to swivel the cage of a troughing roller assembly oppositely disposed, there being a connection beneath the troughed belt and between the swivelable cages.

With the foregoing considerations in mind it is a principal object of this invention to afford a construction for correcting the misalignment of the belt of an endless belt conveyor, which construction is characterized by being entirely automatic in operation and also characterized by complete absence of guiding means acting against the edge of the belt for correcting such misalignment.

Another object is to provide a construction for supporting and adjusting the troughing rollers of an endless belt conveyor to the end that the amount of troughing of the belt may be adjusted as desired, and to the end that the troughing rollers may be adjusted in position automatically to correct the misalignment of the belt.

Other objects and important features of the invention will be apparent from a study of the description following taken with the drawings which together illustrate a preferred embodiment of the invention and what is now considered to be the best mode of practicing the principles thereof. Other embodiments of the invention will be suggested to those having the benefit of the teachings herein, and it is therefore intended that the scope of the invention not be limited by the precise embodiment shown and described herein, nor otherwise than by the scope and terms of the claims subjoined.

In the drawings:

Fig. 1 is a reduced in size plan view of a portion of a belt conveyor having embodied therein a belt aligning troughing assembly according to the present invention;

Fig. 2 is an enlarged plan view, as compared to Fig. 1, of part of the troughing assembly shown in Fig. 1 and taken along the line 2—2 of Fig. 3;

Fig. 3 is a front elevation view thereof;

Fig. 4 is a vertical longitudinal cross section taken on the line 4—4 of Fig. 2 looking in the direction of the arrows, the assembly being shown in position corresponding to the no load condition of the belt; and Fig. 5 is an exploded isometric view showing components making up the troughing assembly shown in Figs. 1 to 4.

Referring now to the drawings, the improved belt aligning and troughing roller assembly according to the present invention is referred to generally by the reference numeral 10, there being a pair of such assemblies mounted upon a transverse support or base 11, and forming a support for an endless belt conveyor 12, such assemblies underlying the belt conveyor and being spaced at intervals longitudinally thereof. While not shown, the return run of the belt 12 extends beneath the transverse base 11, and any convenient means for properly positioning the base 11 and affording support of the return run of the belt may be provided.

Each side of the transverse support or base 11 is provided with a trunnion support 13 held to the base 11 by cap bolts 14. The trunnion support 13 comprises a pair of spaced vertical standards 16, 16 each having a trunnion receiving slot 17 in the upper end thereof. A frame 18 having oppositely extending trunnions 19 is supported by the trunnion support 13 in the slots 17 and between the vertical standards 16 thereof.

The frame 18 consists of spaced arms 21 extending laterally and inwardly of the trunnion support 16, and each arm 21 has a threaded rod 22 extending inwardly therefrom to provide support for a counterweight 23 consisting of laminations 24 held between nuts 26 threaded to the rods 22. The frame 18 also consists of spaced arms 27 extending laterally and outwardly of the trunnion support 16, and the ends of the arms 27 are spanned by a track or plate 28 having a friction surface 29 on the upper side thereof for a purpose as will appear.

The frame 18 also consists of arms 31 depending below the trunnions 19, and a web 32 spans the distance between the depending arms 31. A bearing 33 is supported upon the web 32 at the center thereof and a flange 34 extends below the web 32 and retains a bushing 36 in alignment with the bearing 33 to receive a pintle extending downward from a cage 38. As seen more clearly in Fig. 5, the cage 38 is substantially rectangular in shape with end walls 39 and side walls 41 spanned substantially centrally of the length thereof by a web member 42 from which the pintle 37 extends.

The tops of the end walls 39 are provided with rectangular slots 43 to receive a shaft 44 which is square notched as at 46 adjacent each end so that the shaft 44 may be held against rotation by the rectangular slots 43. A hollow aligning and supporting roller 47 has end bells 48 at each end thereof supporting bearings 49 mounted on the shaft 44, the bearings 49 and the interior of the roller 47 being thus sealed against the entrance of dirt or foreign material in the manner shown.

A friction wheel 51 is mounted on the shaft 44 adjacent the outer end thereof and between the outer end of the aligning roller 47 and the outer end wall 39. The friction wheel 51 has a periphery 52 made of friction material, and is supported upon a bearing 53, and is also spaced from the outer end of the aligning roller 47 by a bushing 54 mounted on the shaft 44.

The friction wheel 52 and the friction surface 29 are urged into contact with each other by a spring 56 anchored at one end to a screweye 57 extending from the outer end of the shaft 44 and at its other end to a screw-eye 58 held to the base 11.

The tilting movement of the frame 18 with respect to the vertical standards 16 is adjustably limited by a block 59 fastened to one of the standards 16 and a pair of stop screws 61 and 62 which cooperate with an arm 63 extending laterally of one of the trunnions 19, stop screw 61 engaging the arm 63 to limit the tilting movement in one direction, and stop screw 62 engaging the arm 63 to limit the tilting movement in the other direction.

The swiveling movement of the cage 38 with respect to the frame 18 is opposed by a pair of leaf springs 64 and 66, each of said springs being anchored at 67 to the inner side of the arms 27 and extending away therefrom toward the outer surfaces of the side walls 41 of the cage 38. The springs 64 and 66 contact the outer surfaces of the side walls 41 and the free ends thereof are turned back on themselves as at 68 to abut the outside of the arms 27, the cage 38 being thus centered between the springs 64 and 66 during the normal position of the cage 38 and the roller 47.

From the description thus far it will be apparent that the frame 18 may be tilted in accordance with the loading of the belt 12, the amount of such tilt being additionally determined by the counterweight 23 and being limited by the stop screw 61. The counterweight 23 also urges the friction surface 29 into contact with the periphery of the friction wheel 52, being additionally accomplished by the spring 56. The cage 38 together with the roller 47 is adapted to swivel with respect to the frame 18 on the pintle 37, such swiveling movement thereof being restrained by the springs 64 and 66.

In the event of misalignment of the belt 12, causing same to ride outwardly to the right as seen in Figs. 3 and 4, the contact of the edge thereof with the friction wheel 52 will rotate the wheel 52 on the track 29 thus giving a swiveling movement to the cage 38 and roller 47 about the pintle 37 in a direction whereby the right end of the roller 47 will move in the direction of travel of the belt 12. Since the belt 12 will tend to travel in a direction normal to the axis of rotation of the roller 47, the belt 12 will be shifted to the left to correct the alignment thereof.

The shift of the axis of rotation of the roller 47 is employed to shift the axis of rotation similarly of the opposite aligning roller assembly as seen in Fig. 1. By shifting the opposite rollers 47 concurrently in a corrective direction the re-aligning effect is increased. To this end the cage 38 is provided with a bracket 69 extending in a direction towards the axis of the trunnions 19 and spaced from the stop arm 63. The end of the bracket 69 has a pin 71, and a ball joint 72 on the end of a link 73 is connected with the pin 71. The other end of the link 73 is connected in similar fashion to a bracket 69 and cage 38 of the opposite roller aligning assembly. As seen in Fig. 3, the link 73 is bent as at 74 so as to clear the underside of the troughed belt 12.

It should be noted that the axis of the pin 71 is in substantial alignment with the axis through the trunnions 19 so that the oppositely disposed frames 18 may tilt up and down independently of one another about their respective trunnions 19. The swiveling movement of the cage 38 about the pintle 37 will be transmitted through the line 73 to provide a double re-aligning action of the belt 12 irrespective of which side the belt is misaligned and irrespective of the direction of movement thereof.

The provision of the link 73, it should be emphasized, is not absolutely necessary, but is desired for best operation.

In illustrating the invention herein a metal belt has been shown, which is usually supported by inclined troughing rollers only and hangs substantially as a loaded catenary between the aligning rollers 47. In a conveyor employing composition belting the usual horizontal support rollers would be employed, but the structure according to the present invention would be applicable either to metal or composition belting.

From the description foregoing it will be apparent that there has been provided a novel structure for correcting the misalignment of a belt conveyor, which structure is characterized by friction means for adjusting the position of aligning rollers, the friction means being effective irrespective of the degree of troughing of the belt. The swiveling movement of the rollers in correcting misalignment is controlled by the leaf springs opposing the movement of the cage supporting the roller. The structure is further characterized by implementing the corrective movement of the roller by concurrent movement of an oppositely disposed aligning roller. The operation of the friction wheel 52 is also independent of the proper functioning of the aligning roller 47, and should the aligning roller 47 become stuck on the shaft 44, such sticking will not affect the friction wheel, thus enabling it to cause swiveling of the cage 38.

While the invention has been described in terms of a preferred embodiment thereof, the scope of the invention is intended to be limited only by the terms of the claims here appended.

I claim:

1. An idler roller assembly for supporting and correcting the misalignment of an endless conveyor belt comprising a support for a frame which is tiltable in accordance with the loading of said belt about an axis extending longitudinally of said belt, a cage mounted on said frame for limited swiveling movement with respect to said frame about an axis substantially normal to the tilting axis of said frame, a belt supporting roller supported for rotation by said cage on an axis normally transverse to the belt, an adjusting wheel supported by said cage and positioned for rotation by said belt upon misalignment thereof, and a track supported by said frame and engaging said wheel, so that upon rotation of said wheel said cage will be swiveled in a direction whereby the roller supported thereon will urge said belt to aligned position.

2. An idler roller assembly for supporting and correcting the misalignment of an endless conveyor belt comprising a support for a frame which is tiltable in accordance with the loading of said belt about an axis extending longitudinally of said belt, a cage mounted on said frame for limited swiveling movement with respect to said frame about an axis substantially normal to the tilting axis of said frame, a belt supporting roller supported for rotation by said cage on an axis normally transverse to the belt, an adjusting wheel supported by said cage and positioned for rotation by said belt upon misalignment thereof, a track supported by said frame and engaging said wheel so that upon rotation of said wheel said cage will be swiveled in a direction whereby the roller supported thereon will urge said belt to aligned position, and biasing means acting between said frame and said cage urging the latter about said swivel axis toward a position where the axis of said roller is normal to the belt.

3. An idler roller assembly for supporting and correcting the misalignment of an endless conveyor belt comprising a support for a frame which is tiltable in accordance with the loading of said belt about an axis extending longitudinally of said belt, a cage mounted on said frame for limited swiveling movement with respect to said frame about an axis substantially normal to the tilting axis of said frame, a belt supporting roller supported for rotation by said cage on an axis normally transverse to the belt, an adjusting wheel supported by said cage and positioned for rotation by said belt upon misalignment thereof, a track supported by said frame and engaging said wheel so that upon rotation of said wheel the cage will be swiveled in a direction whereby the roller supported thereon will urge the belt to properly aligned position, a counterweight on said frame and a spring connecting said cage to said support to urge said wheel and track into contact with each other.

4. An idler roller assembly for supporting and correcting the misalignment of an endless conveyor belt comprising a support for a frame which is tiltable in accordance with the loading of said belt about an axis extending longitudinally of said belt, a cage mounted on said frame for limited swiveling movement with respect to said frame about an axis substantially normal to the tilting axis of said frame, a belt supporting roller supported for rotation on said cage on an axis normally transverse to the belt, an adjusting wheel having a peripheral surface of friction material thereon and supported by said cage for rotation by said belt upon misalignment thereof, and a track supported by said frame and having a frictional surface thereon engaged by the periphery of said wheel, so that upon rotation of said wheel said cage will be swiveled in a direction whereby the roller supported thereon will urge said belt to aligned position.

5. A self-centering idler assembly for a conveyor belt comprising a transverse support for a pair of trunnion supports spaced laterally of the transverse support on each side of the center line of said belt and beneath the same, each of said trunnion supports having a frame mounted thereon for tilting movement about an axis extending longitudinally of said belt, a cage mounted on said frame for swivelable movement with respect thereto about an axis which is substantially parallel to a line normal to the first mentioned axis, a belt supporting roller mounted on said cage, means operable upon misalignment of said belt for swiveling said cage with said roller in a direction to urge said belt to aligned position, and a linkage connecting said cages so that the swiveling movement of one will be transmitted to the other to implement the alignment of said belt.

6. The invention as defined in claim 5 wherein the linkage is connected to the cage at a point lying on the axis of tilting movement of said frame so that the cages may be shifted without being affected by the tilting movement of said frames.

7. The invention as defined in claim 5 wherein the link is connected at each end thereof to said cage by a universally pivotal connection.

WILLIAM W. SLOANE.

References Cited in the file of this patent

UNITED STATES PATENTS

| Number | Name | Date |
|---|---|---|
| 270,718 | Albey | Jan. 16, 1883 |
| 994,910 | Duesterhoff | June 13, 1911 |